United States Patent

Koch

[11] Patent Number: 5,861,723
[45] Date of Patent: Jan. 19, 1999

[54] WINDSCREEN WIPER DEVICE

[75] Inventor: Stefan Koch, Ottersweier, Germany

[73] Assignee: Robert Bosch GmbH, Stuttgart, Germany

[21] Appl. No.: 693,336
[22] PCT Filed: May 11, 1995
[86] PCT No.: PCT/DE95/00623
  § 371 Date: Aug. 15, 1996
  § 102(e) Date: Aug. 15, 1996
[87] PCT Pub. No.: WO95/31361
  PCT Pub. Date: Nov. 23, 1995

[30] Foreign Application Priority Data

May 18, 1994 [DE] Germany ............ 44 17 370.9

[51] Int. Cl.⁶ ............................................. H02P 1/00
[52] U.S. Cl. ........................ 318/285; 318/443; 318/444
[58] Field of Search ............................ 318/443, 444, 318/DIG. 2, 280, 284; 15/250, 250.12, 250.17; 307/10.1

[56] References Cited

U.S. PATENT DOCUMENTS 4,614,903  9/1986  Betsch et al. .................. 318/443

FOREIGN PATENT DOCUMENTS 2944224  5/1981  Germany.

Primary Examiner—William M. Shoop, Jr.
Assistant Examiner—Kim Lockett
Attorney, Agent, or Firm—Spencer & Frank

[57] ABSTRACT

A windscreen wiper device includes at least one wiper arm (10) that is driven by an electric motor (11), whose rotary direction is variable at least in the respective extreme position. Upon the change of rotary direction, the electrical power made available to the electric motor (11) is reduced. The rated power is not made available until either a specified time has elapsed or a specified position of the wiper arm (10) has been reached. For specifying a reduced electrical power, a reduction in the current flowing through the electric motor (11) is especially well-suited. The windscreen wiper device according to the invention makes for a slight thermal load on both the electric motor (11) and the drive stage (19).

11 Claims, 1 Drawing Sheet

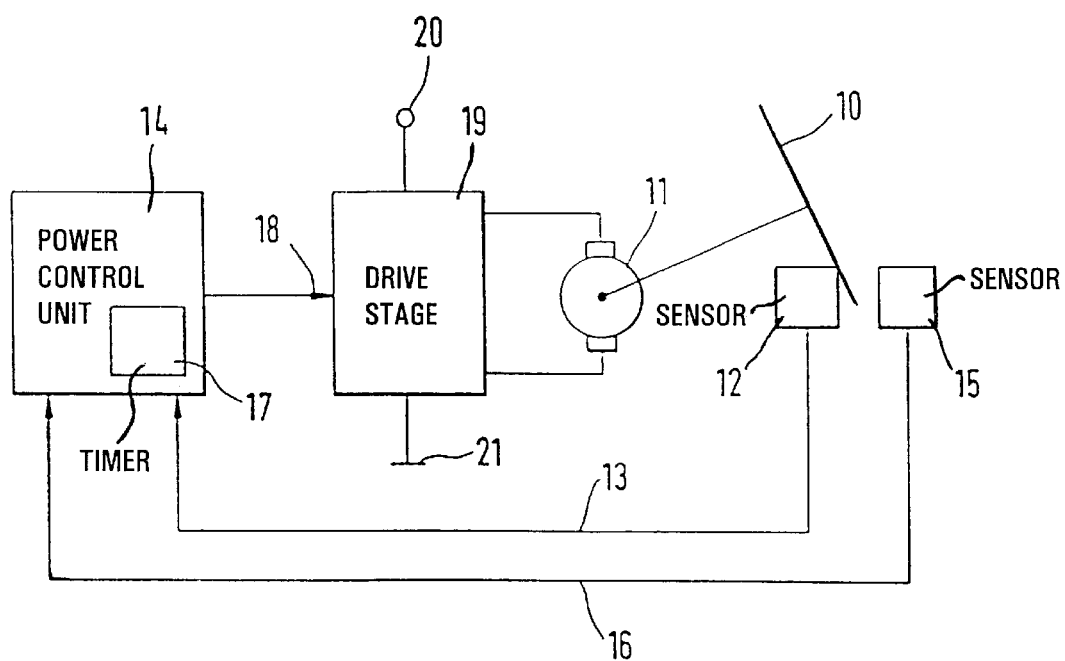

WINDSCREEN WIPER DEVICE

BACKGROUND OF THE INVENTION

The invention is based on a windscreen wiper device of the type having at least one wiper arm that is driven by an electric motor whose rotary direction is variable at least in the extreme positions, with the electric power made available to the electric motor being reduced upon the change of rotary direction. From German Patent 29 44 224, a windscreen wiper device of this generic type is known that includes an electric motor whose direction of rotation can be varied in the extreme positions of a wiper arm. A pendulum gear, which produces a reciprocating motion from a rotary motion, can be dispensed with. The known device includes a drive stage that performs a reversal of the polarization of the electric motor operating voltage in the extreme positions. Imposing the full operating voltage on the electric motor that has come to a stop in the extreme positions leads to the occurrence of a starting current in the electric motor that is multiple times above the normal operating current. If the reversal of polarization of the electric motor takes place after the extreme position has been reached without any deceleration process, which is accomplished for instance by short-circuiting the electric motor, then the starting current can rise to twice the value, since the electromotive contrary force of the electric motor is added to the voltage of the energy source.

SUMMARY OF THE INVENTION

The object of the invention is to provide a windscreen wiper device that has a reduced load on the electric motor and on the end stage.

This object is attained by providing a windscreen (or windshield) wiper device which is characterized in that a timer is provided, which is started by an extreme-position signal, and in that the rated power is not made available to the electric motor until after a period of time specified by the timer has elapsed.

The windscreen wiper device of the invention has the advantage that the thermal load on the electric motor and that of the drive stage are reduced during the change of rotary direction of the electric motor in the region of the extreme positions of the wiper arm. According to the invention, it is provided that the electric power made available to the electric motor is reduced upon the change of rotary direction. With this provision, the occurrence of a high starting current, which in combination with ohmic resistances leads to a thermal load on the end stage and the motor, is lessened.

In a first advantageous embodiment it is provided that the rated power is not made available to the electric motor until after a specified position has been reached. Another provision provides that the rated power is not made available to the electric motor until after a specified position of the wiper arm has been reached. The specified position is located within the sweep range in the vicinity of the associated extreme position. What is necessary is one additional position sensor, which can be in the form of a wiper contact, for instance, and cooperates with a wiper disk.

One suitable provision for reducing the power made available to the electric motor compared to the rated power is attainable by reducing the furnished operating voltage. Another advantageous option for reducing the electrical power made available to the electric motor compared with the rated power contemplates reducing the current flowing through the electric motor. Reducing the current, in particular, can be accomplished by especially simple means in the context of a clocked mode of operation. The clocked mode provides that the electric motor is either connected to the full available operating voltage, or disconnected from it entirely. The clock signal may have a variable frequency and/or a variable duty cycle. Both the frequency and the duty cycle can be chosen for instance taking the motor specifications into account. As a further criterion, the undesired emission of electromagnetic interference radiation can also be taken into account.

Another advantageous feature of the device of the invention provides that before the reversal of polarity, when the extreme position is reached, the electric motor is first short-circuited. With this provision, fast braking of the motor, a rapid reduction in the electromotive contrary voltage and a reduced thermal load on the motor are attained.

Further advantageous features and embodiments of the invention windscreen wiper device of the invention will become apparent from the ensuing description.

BRIEF DESCRIPTION OF THE DRAWING

The single drawing FIGURE is a block circuit diagram of a windscreen wiper device according to the invention.

DESCRIPTION OF THE PREFERRED EMBODIMENTS

The FIGURE shows a wiper arm 10, which executes a reciprocating motion on a windscreen, not shown in further detail. The wiper arm 10 is driven by an electric motor 11. An extreme-position sensor 12 ascertains when the wiper arm 10 reaches one or the other extreme position and thereupon outputs an extreme-position signal 13 to a power-specifying arrangement or power control unit 14.

The power control unit 14 is supplied by a position sensor signal 15 with a position sensor 16 that indicates the reaching of a specified position of the wiper arm 10 in the vicinity of the extreme position. The power control unit 14 includes a timer 17, which can be started by the extreme-position signal 13. The power control unit 14 outputs a power-specifying and rotary direction signal 18, or control signal 18 to an end or drive stage 19. The electric motor 11 is connected to the drive stage 19. The end stage 19 is connected to an energy source, not shown in detail, at a first terminal 20 and a second terminal 21.

The windscreen wiper device according to the invention functions as follows:

On a windscreen, not shown in further detail, whose surface is to be cleaned, the wiper arm 10 executes a reciprocating motion. The reciprocating motion is achieved by reversing the polarity of the electric motor 11, which by way of example is in the form of a permanent-magnet-excited DC motor or an electronically commutated AC motor.

The attainment of the extreme positions is detected by the extreme-position sensor 12. The extreme-position sensor 12 is for instance a separate sensor or preferably a control disk, not shown in further detail, that is coupled to the electric motor 11 or to a drive mechanism, not shown, and that contains wiper rings.

Instead of the extreme-position sensor 12, a position sensor may be provided that outputs a signal which is a measure for an arbitrary position of the windscreen wiper 10. In the context of a more-complicated and expensive windscreen wiper device, it is possible with such a position sensor to achieve a restricted wiping mode that is adjusted down to a reduced wiping range. The extreme-position signal 13 is intended to occur in such a reduced wiping mode as well and to cause a change of rotary direction of the electric motor 11.

After the appearance of the extreme-position signal 13, braking of the electric motor 11 can first be provided. Effective braking of the electric motor 11 takes place for instance by short-circuiting the motor supply terminals (free-wheeling with active braking of the motor). The short-circuiting of the electric motor is brought about with the control signal 18, which controls the drive stage 19 accordingly. The drive stage 19 preferably includes a bridge circuit, on whose diagonal the electric motor 11 is disposed. Short-circuiting of the electric motor 11 is attained for instance by simultaneously turning on either the two lower or the two upper bridge branches. The change of rotary direction of the electric motor is undertaken by reversing the polarity of the operating voltage. Applying the full reversed-polarity operating voltage before the motor has been braked would produce a severely elevated starting current in the electric motor 11 and in the actuated bridge branches of the drive stage 19. The correspondingly high thermal load that would occur from the unavoidable ohmic resistance losses is undesirable and in an extreme case can cause destruction of individual components. The components used would have to be designed at least for a comparatively higher current load and the at least briefly high thermal load.

According to the invention it is therefore provided that the electrical power made available to the electric motor 1 is reduced upon the change of rotary direction.

In the first exemplary embodiment it is provided that the rated power is not made available to the electric motor 11 until after a specified period of time has elapsed. The specified period of time is furnished by the timer 17, which is started by the extreme-position signal 13. During this time period, a reduced power for the electric motor 11 is specified by the power-specifying and rotary direction or control signal 18, via the drive stage 19.

In another exemplary embodiment, it is provided that the electric motor is not supplied with the rated power until after a specified position is reached. Both reversing the polarity of the operating voltage and reducing the power are brought about directly upon the occurrence of the extreme-position signal 13. Not until the wiper arm 10 has received the position dictated by the position sensor 15 does the control signal 18 release the full power for the electric motor 11. The specified position that the position sensor 15 dictates can, in a simple embodiment of the windscreen wiper device, be a fixedly specified position that is located in the vicinity of the extreme position. In the more-expensive version of the windscreen wiper device, in which instead of the extreme-position sensor a position sensor is provided that outputs a signal that is a measure of the current position of the wiper arm 10 on the windscreen, a first position value can be specified for the extreme position and a second position value can be specified for the specified further position. In that case, the additional position sensor 15 is omitted.

In an advantageous feature, it is provided that the control signal 18 increases the power specified for the electric motor continuously, beginning at a starting value, up to full power. For carrying out this task, the power control unit 14 includes a signal generator, whose signal fixes the course of the rise in the specified power.

The power specification for the electric motor 11 is effected in the drive stage 19. It is possible to reduce either the voltage or the current, or both variables simultaneously, compared with the rated mode. Reducing the current flowing through the electric motor 11 is especially suitable. Reducing the current is especially easy to accomplished by using a clocked mode in which the electric motor is either connected to the full operating voltage or turned off, in chronological alternation. The clock frequency or the duty cycle may be variable. Both variables and in particular the frequency can be fixed as a function of the motor specifications. A lower limit for the ON time is dictated by the fact that the current flowing through the electric motor can be allowed to rise only up to a maximum specified value during a turn-on pulse. The current rise time is determined substantially by the inductance of the motor winding. An upper limit for the frequency is set in that a certain amount of emitted high-frequency energy should not be exceeded. By varying the duty cycle, for instance at a fixedly specified frequency, continuously increasing the power can be accomplished without additional expense.

The reduction in the voltage made available to the electric motor 11 has the advantage of high electromagnetic compatibility, since there are no switching pulses with correspondingly high spectral components.

The windscreen wiper device of the invention is especially suitable for use in motor vehicles. The electric motor 11 shown in the drawing may drive either one wiper arm or a plurality of wiper arms 10 simultaneously. In one motor vehicle, a plurality of electric motors may be provided, which each separately drive wiper arms 10.

I claim:

1. An improved windscreen wiper device having at least one wiper arm that is movable between extreme positions and that is driven by an electric motor (11) whose rotary direction is variable at least in the extreme positions, the electric power made available to the electric motor (11) being reduced from a rated power upon a change of rotary direction, wherein the improvement comprises:

a timer (17) which is started by an extreme-position signal (13), and means for making less than the rated power available to the electric motor (11) until after a period of time specified by the timer (17) has elapsed, the means reducing current to the electric motor (11) before the period of time has elapsed by driving the electric motor (11) in a clocked mode in which the electric motor (11) is repeatedly connected to a power source and then turned off in an alternating sequence.

2. The windscreen wiper device of claim 1, wherein the means further comprises means for short-circuiting the electric motor (11) before the change of rotary direction.

3. The windscreen wiper device of claim 1, wherein the means further comprises means for reducing the voltage compared with the voltage when the rated power is provided to the electric motor (11).

4. The windscreen wiper device of claim 1, wherein the means further comprises means for providing a continuous increase in power to the electric motor (11) until the period of time has elapsed.

5. The windscreen wiper device of claim 1, in combination with a motor vehicle.

6. The windscreen wiper device of claim 1, wherein the clocked mode has a frequency that is variable.

7. The windscreen wiper device of claim 1, wherein the clocked mode has a duty cycle that is variable.

8. A windscreen wiper device for use with a motor vehicle having a power source, comprising:

a wiper arm that is mounted for reciprocating movement between a pair of extreme positions;

sensor means for sensing when the wiper arm reaches one of the extreme positions;

a motor coupled to the wiper arm; and means, responsive to the sensor means, for transferring power from the power source to the motor so as to rotate the motor in clockwise and counterclockwise directions to thereby move the wiper arm back and forth between the extreme positions, the means including a timer and means for driving the motor at a reduced power level while the wiper arm is in the vicinity of the extreme positions for a period of time determined by the timer, by repeatedly connecting and disconnecting the motor from the power source to drive the motor in a clocked mode.

9. The windshield wiper device of claim 8, wherein the clocked mode has a frequency which is variable.

10. The windshield wiper device of claim 8, wherein the clocked mode has a duty cycle which is varied so as to increase the power transferred to the motor as the wiper arm moves away from the nearest extreme position.

11. The windshield wiper device of claim 8, wherein the means further comprises means for short-circuiting the motor before it changes directions.

* * * * *